United States Patent
McDonald et al.

(10) Patent No.: US 12,028,662 B2
(45) Date of Patent: *Jul. 2, 2024

(54) HOT-SWAPPABLE NO CABLE TOUCH SWITCH ENCLOSURE

(71) Applicant: HEWLETT PACKARD ENTERPRISE DEVELOPMENT LP, Spring, TX (US)

(72) Inventors: Nicholas McDonald, Fort Collins, CO (US); Gary Gostin, Plano, TX (US); Alan Davis, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,580

(22) Filed: Jan. 13, 2023

(65) Prior Publication Data

US 2023/0156380 A1 May 18, 2023

Related U.S. Application Data

(63) Continuation of application No. 17/048,850, filed as application No. PCT/US2018/029885 on Apr. 27, 2018, now Pat. No. 11,558,682.

(51) Int. Cl.
*H04Q 11/00* (2006.01)
*H04L 49/00* (2022.01)
*H04L 49/15* (2022.01)
*H04L 49/45* (2022.01)

(52) U.S. Cl.
CPC ......... *H04Q 11/0005* (2013.01); *H04L 49/15* (2013.01); *H04L 49/30* (2013.01); *H04L 49/45* (2013.01); *H04Q 2011/0041* (2013.01); *H04Q 2011/0052* (2013.01)

(58) Field of Classification Search
None
See application file for complete search history.

(56) References Cited

U.S. PATENT DOCUMENTS

| | | | |
|---|---|---|---|
| 5,515,515 A | 5/1996 | Kennedy et al. | |
| 5,675,472 A | 10/1997 | Hamerton-Kelly | |
| 7,587,115 B1 * | 9/2009 | Thorson | G02B 6/43 385/136 |
| 7,969,751 B2 | 6/2011 | Yamamoto et al. | |
| 9,900,101 B2 | 2/2018 | Leigh et al. | |
| 11,558,682 B2 * | 1/2023 | McDonald | H04Q 11/0005 |
| 2003/0051024 A1 | 3/2003 | Garnett et al. | |
| 2004/0037553 A1 * | 2/2004 | Ramaswami | H04J 14/0293 398/5 |

(Continued)

OTHER PUBLICATIONS

International Search Report and Written Opinion received for PCT Patent Application No. PCT/US2018/029885, mailed on Jan. 31, 2019, 15 pages.

*Primary Examiner* — Nathan M Cors
(74) *Attorney, Agent, or Firm* — Sheppard Mullin Richter & Hampton LLP (57) ABSTRACT

A system for hot swapping a network switch without disconnecting the network switch connectors is provided. The system disaggregates the switch faceplate network cable connectors from the internal components of the network switch so that the internal switch components may be removed from the switch without disconnecting the switch network cables.

17 Claims, 8 Drawing Sheets

(56) References Cited

U.S. PATENT DOCUMENTS

| | | | |
|---|---|---|---|
| 2005/0047795 A1* | 3/2005 | Windover | G02B 6/43 |
| | | | 398/164 |
| 2006/0193112 A1 | 8/2006 | Cauthron | |
| 2006/0236138 A1 | 10/2006 | Bieker et al. | |
| 2008/0112133 A1 | 5/2008 | Torudbakken et al. | |
| 2014/0331009 A1 | 11/2014 | Parsonese et al. | |
| 2015/0323754 A1* | 11/2015 | Leigh | G02B 6/4293 |
| | | | 385/14 |
| 2016/0192532 A1 | 6/2016 | Tseng et al. | |
| 2016/0234962 A1 | 8/2016 | Shinsato | |
| 2017/0199336 A1* | 7/2017 | Megason | G02B 6/3849 |

* cited by examiner

HOT-SWAPPABLE NO CABLE TOUCH SWITCH ENCLOSURE

CROSS REFERENCE TO RELATED APPLICATIONS

This application is a continuation of, and claims the priority benefit of, U.S. patent application Ser. No. 17/048,850, filed on Oct. 19, 2020, now U.S. Pat. No. 11,558,682, which is a 371 National Stage Entry of PCT/US2018/029885, filed on Apr. 27, 2018, which are incorporated herein by reference in their entirety.

GOVERNMENT RIGHTS

This invention was made with Government support under Prime Contract No. DE-AC52-07NA27344 awarded by DOE. The Government has certain rights in this invention.

BACKGROUND

Large-scale computing systems typically use thousands of interconnected nodes that collaborate to process tasks on multiple levels. The interconnected nodes can be configured to collaborate at the operating system level or to run as a cluster, for example, to allow multiple nodes to share the workload associated with processing incoming requests. The nodes in the computing system are connected together by network cables plugged into multiport switches at the node level that collectively establish the network topology of the computing system. The network cables are typically connected between ports of switches in specific configurations that allow for data transfer through the network topology.

The network cables interconnecting ports of the network devices have several disadvantages that negatively impact the performance and serviceability of the network topology. For example, network cables are required to be removed from the switch connection ports to allow for service of the switch, and the repeated removal and reconnection of the network cables to the switch ports is known to cause network cable connector failures, which requires replacing the network cable terminating connector or even the network cable as a whole. If the network cable as a whole is replaced, often times operators will simply cut the ends off the damaged network cable and leave the cable inactive in the cable bundle, as replacing the network cable associated with a cable bundle can cause damaged to other network cables running through walls, in cable trays, under raised floors, etc. and therefore exacerbate the initial problem of having one network cable not working properly. Over time this "cut and leave" practice results in multiple unused and unmarked network cables without end connectors taking up space in the topology infrastructure.

Another disadvantage of current network cable connection practice is that network cables must to be removed before the network switch or components of the switch can be repaired or replaced. As such, in a typical thirty-six port network switch with a technical failure, thirty-six network cables connected to the switch ports need to be unplugged from their respective switch ports to allow for a new or repaired switch or switch component to be installed. Further, once the new or repaired switch or component is installed, the thirty-six network cables must then be reconnected to their respective switch ports to enable proper operation in the network topology. One common repair function for a network switch is to replace the application-specific integrated circuit (ASIC) of the switch, which again requires each of the network cables connected to the network switch ports to be disconnected for the repair and then reconnected once the repair is complete.

Therefore, the ability to repair or replace an internal component of a network switch without requiring the associated network switch cable connections to be unplugged is desired.

BRIEF DESCRIPTION OF THE DRAWINGS

So that the manner in which the recited features, advantages and objects of the present disclosure may be understood in detail, a more particular description may be had by reference to the example embodiments thereof illustrated in the appended drawings. It is to be noted, however, that the appended drawings illustrate only typical or example embodiments of this disclosure and are not to be considered limiting of its scope.

DETAILED DESCRIPTION

In the following, reference is made to examples or embodiments of the described concepts in this disclosure. However, it should be understood that the described concepts are not in any way limited to examples or embodiments described herein. Instead, any combination of the following features, elements, or functionalities, whether related to different embodiments or not, is contemplated by the inventors as a possible combination that may be used to implement and practice aspects of the present disclosure. Furthermore, in various embodiments described in this disclosure provide numerous advantages over the prior art. However, although embodiments of the disclosure may achieve advantages over other possible solutions and/or over the prior art, whether or not a particular advantage is achieved by a given embodiment is also not intended to be limiting on the scope of the disclosure. Therefore, the following aspects, features, functionalities, embodiments, and advantages are intended to be illustrative and are not considered elements or limitations of the appended claims, except where explicitly recited in a claim. Similarly, any reference to the "invention," "innovation," "inventive concept," etc. is not be construed as a generalization of any inventive subject matter disclosed herein and shall not be considered to be an element or limitation of the appended claims except where explicitly recited in a claim.

The following disclosure provides a hot swappable solution for network switches that allows for replacement of network switches or network switch components without requiring disconnection of the network cables connected to the switch. The solution disaggregates the switch faceplate network cable connectors from the internal components of the network switch so that, for example, the switch ASIC board or module may be removed from the switch without disconnecting the switch network cables. This is accomplished by a disconnectable internal switch connection that electrically or optically connects the switch ASIC board or module to the internal switch components, including the faceplate network cable connectors. The disconnectable connection between the switch ASIC board and the switch internal components allows for ASIC modules and other switch internal components to be installed or repaired without disconnecting any network connection cables.

Figure 1:
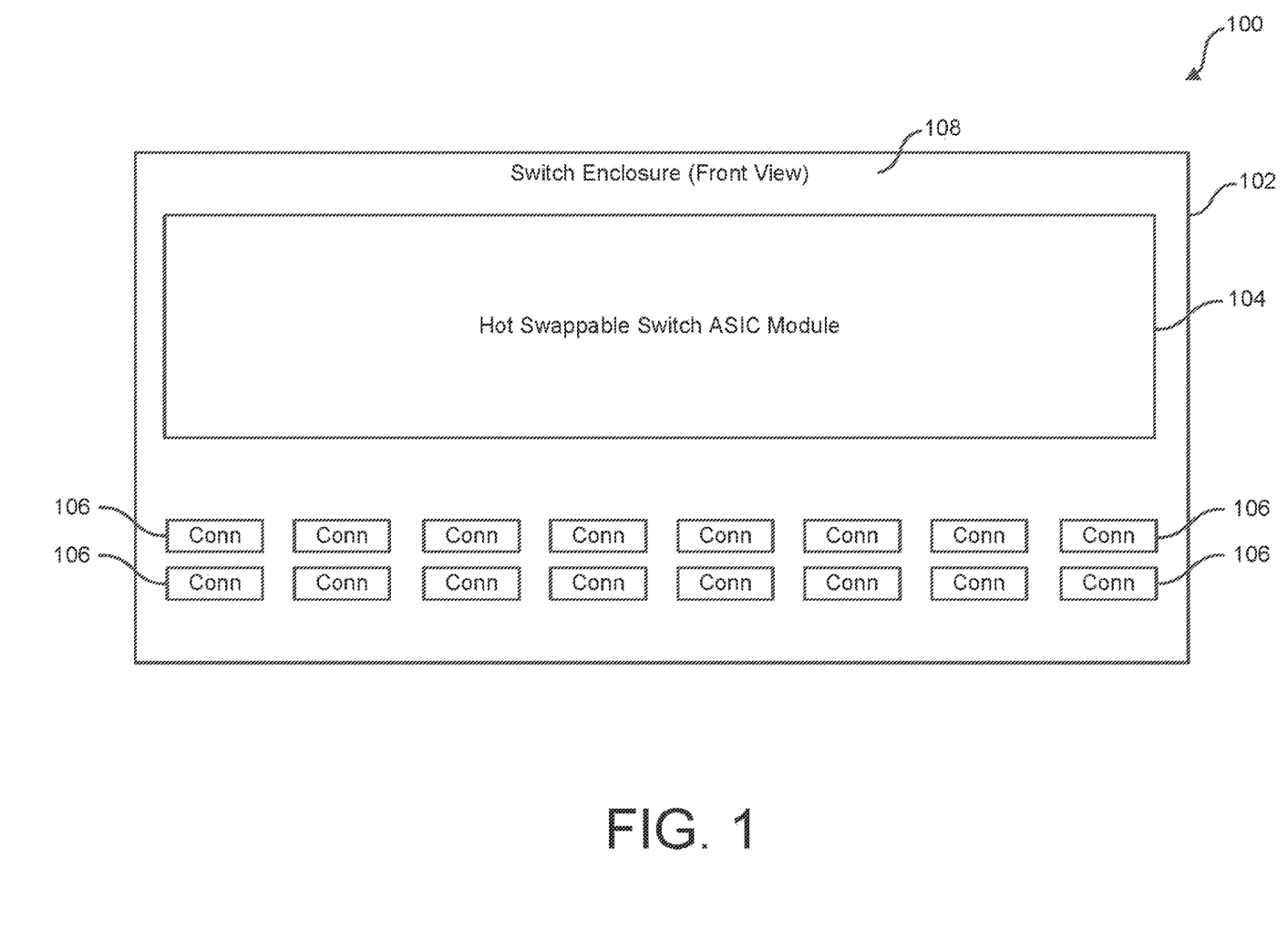
FIG. 1 illustrates a front schematic view of an example switch enclosure.

FIG. 1 illustrates a front schematic view of an example switch 100. The example switch 100 includes a switch enclosure 102 that contains a plurality of switch related components therein. The switch enclosure 102 includes a front side 108 having a plurality of network cable connection ports 106 and one or more switch status indicators, typically LEDs that illuminate to indicate various operational parameters of the switch 100. The front side 108 of the switch enclosure 102 includes a hot swappable ASIC switch module 104 that is removably positioned within the switch enclosure 102. The hot swappable ASIC switch module 104 may be slidably received in (and removed from) the switch enclosure 102, for example, by inserting the hot swappable ASIC switch module 104 into the switch enclosure 102 along an axis that is perpendicular to the front side 108 of the switch enclosure 102. Therefore, the front side 108 of the switch enclosure 102 may include a slot or recess sized and configured to receive the hot swappable ASIC switch module 104 therein. The network cable connectors 106 on the front side 108, for example, may be the female connector portion of a network connector, such as a CAT5, CAT6, CAT7, or CAT8-type network cable connectors. Other types of network cable connectors 106, such as optical fiber cables. Twisted-pair cabling, ethernet patch cables, and coaxial cables, for example, may be used to connect the network cable connectors 106 to other devices in a computer network topology.

Figure 2:
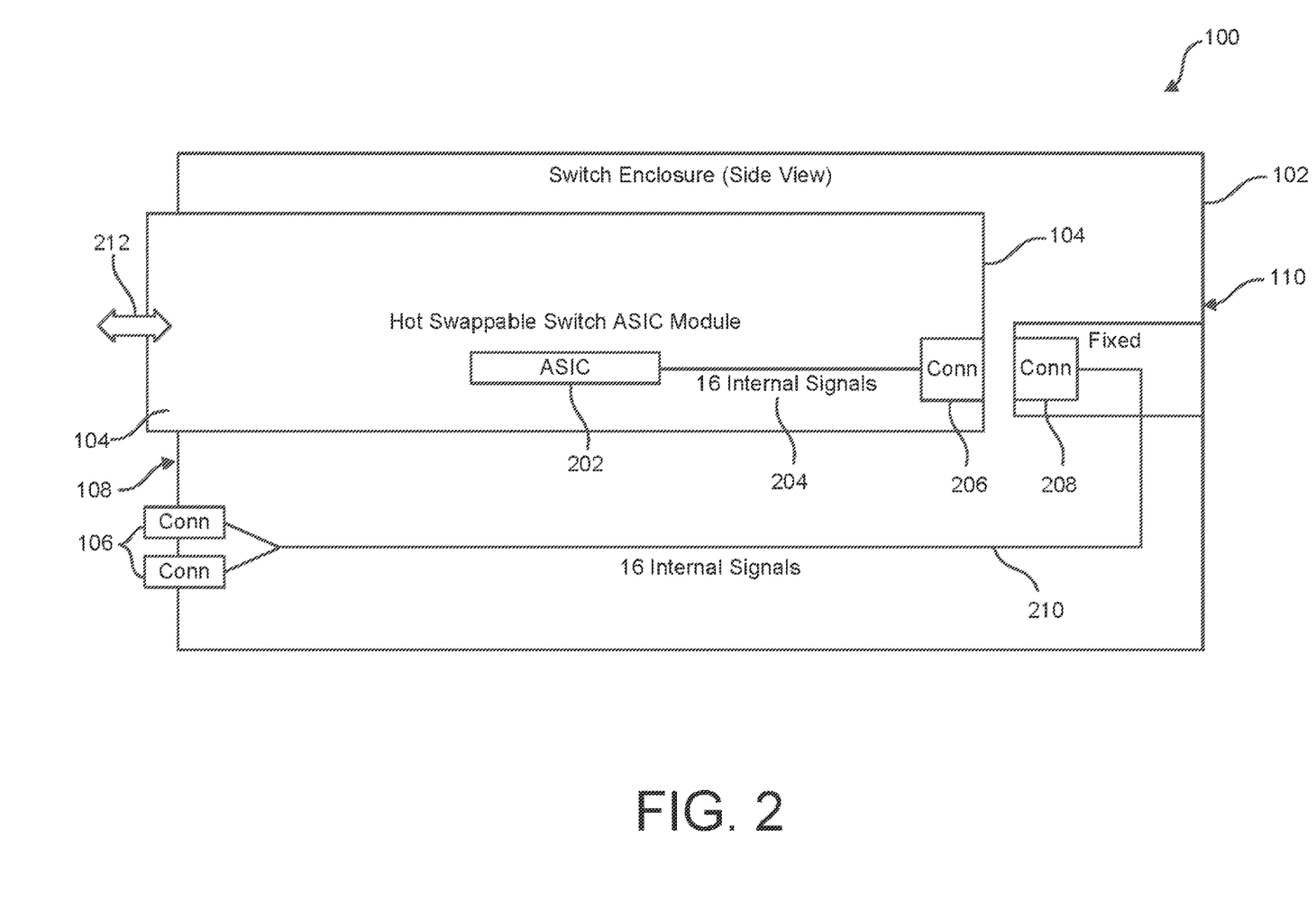
FIG. 2 illustrates a side schematic view of an example switch enclosure.

FIG. 2 illustrates a side schematic view of an example switch 100. The side schematic view of switch 100 shows the hot swappable ASIC switch module 104 at least partially inserted into the switch enclosure 102 in the direction of arrows 212, which is perpendicular to the front side 108 of the switch enclosure 102. The hot swappable ASIC switch module 104 is shown with the ASIC chip or board 202 that is part of the hot swappable ASIC switch module 104 being connected to an ASIC module connector 206 via communication link 204. The communication link 204, for example, may include a multichannel signal transmission medium configured to communicate electronic signals between the ASIC chip 202 and external devices or components of the hot swappable ASIC switch module 104. The communication link 204 may be an electrical/electronic or optical signal transmission link. An ASIC module connector 206 may be attached or mounted to a back portion of the hot swappable ASIC switch module 104, wherein the back portion may be positioned generally opposite the front side 108 and closer to a back side 110 of the switch enclosure 102. The ASIC module connector 206 may be configured to connect to a switch enclosure fixed connector 208. The switch enclosure fixed connector 208 may be mounted in the switch enclosure 102 at a location such that when the hot swappable ASIC switch module 104 is inserted into the switch enclosure 102 that the ASIC module connector 206 is guided to connect with the switch enclosure fixed connector 208 to facilitate minimal loss signal transmission between and through the two connectors 206, 208.

The hot swappable ASIC switch module 104 may be inserted into the switch enclosure 102 in the direction of arrows 212 from the front side 108 toward the back side 110. Similarly, the hot swappable ASIC switch module 104 may be removed from the switch enclosure 102 in the direction of arrows 212 from the back side 110 toward the front side 108. This insertion and removal process may be guided by mechanical devices positioned within the switch enclosure 102 that are configured to engage the hot-swappable ASIC module 104 to guide it into a desired position that facilitates proper connection between the ASIC module connector 206 and the switch enclosure fixed connector 208.

The switch enclosure fixed connector 208 may connect to a communication link 210 configured to receive electronic signals (electrical or optical) from the switch enclosure fixed connector 208 and transmit the electronic signals to the network cable connectors 106 positioned on the front side 108 of the switch enclosure 102. The communication link 210, as further discussed herein, may be an electrical or optical signal communication medium having, for example, 16 or 32 channels. In the example embodiment shown in FIG. 2, the switch enclosure fixed connector 208 is positioned near the back side 110 of the switch enclosure, wherein near the back side 110 is defined as being closer to the back side 110 than the front side 108. Similarly, in the example embodiment discussed below in FIG. 8, the switch enclosure fixed connector 208 is positioned near the front side 108, wherein near the front side 108 is defined as being closer to the front side 108 than the back side 110

The hot-swappable ASIC module 104, for example, may be an electrical, optical, or a combination electrical and optical ASIC module 104. For example, the hot-swappable ASIC module 104 may include an electrical ASIC chip 202 that communicates with an electrical communication link 204 that is in electrical communication with an electrical ASIC module connector 206. The ASIC module connector 206 may communicate with electrical switch enclosure fixed connector 208 that communicates electrical signals through electrical communication link 210 to the network cable connectors 106. The electrical signals may be, for example, an electrical or electromagnetic current or voltage that is used for carrying data/signals from one device or component in a network to another. The electrical signals may be direct current (DC) or alternating current (AC) and may include modulation of either analog or digital signals. The hot-swappable ASIC module 104, for example, may also be a combination electrical and optical ASIC module, wherein the ASIC chip 202 may be configured to output electrical signals that are converted into an optical signal before leaving the switch enclosure 102. For example, an optical transceiver may be positioned in the signal communication path at a location between the ASIC chip 202 and the network cable connector 106 and be configured to receive an electrical signal at an input and output a corresponding optical data signal that continues to propagate through the remainder of the signal transmission path as an optical signal.

The optical transceiver, also called fiber optic transceiver or optical transceiver module, is a hot-pluggable device used in high-bandwidth signal communication applications. Optical transceivers have an electrical interface on one side (I/O) and an optical interface on the other side (I/O) so that the signals passing through the optical transceiver are converted from electrical to optical or optical to electrical (depending on the signal's direction of travel). Therefore, an optical transceiver operates as a photoelectric converter that converts an electrical signal into an optical signal (light) or an optical signal (light) into an electrical signal. In an example embodiment where the hot-swappable ASIC module 104 outputs electrical signal, an optical transceiver may be positioned at the output of the ASIC chip 202, at the input to the ASIC module connector 206, at the output of the switch enclosure fixed connector 208, or at the input to the network cable connectors 106. Essentially, the optical transceiver may be positioned anywhere in the signal path between the ASIC chip 202 and the network cable connectors 106. Further still, in another example embodiment the optical transceiver may be positioned downstream of the network cable connectors 106 such that the signals transmitted from the network cable connector 106 are still in the electrical domain and may be converted to the optical domain in the cable communicating data from the network cable connector 106.

As noted above, the hot-swappable ASIC module 104 may also be an all optical module. For example, the ASIC chip 202 may output an optical signal that is received by the communication link 204 and communicated to the ASIC module connector 206. The optical signal may be further communicated through optical connectors 206, 208 and through an optical communication link 210 to optical network cable connectors 106.

In the example embodiment shown in FIGS. 1 & 2, the hot-swappable ASIC module 104 is decoupled or disaggregated from the network cable connectors 106 on the front side 108 of the switch enclosure 102. This enables the hot-swappable ASIC module 104 to be removed from the switch enclosure 102 without disconnecting any of the signal communication cables or wires connected to the network cable connectors 106. As such, the example configuration illustrated in FIGS. 1 & 2 allows for an ASIC module to be repaired or replaced without removing any of the corresponding network cable connectors that communicate signals to and from the ASIC module 104.

Figure 3:
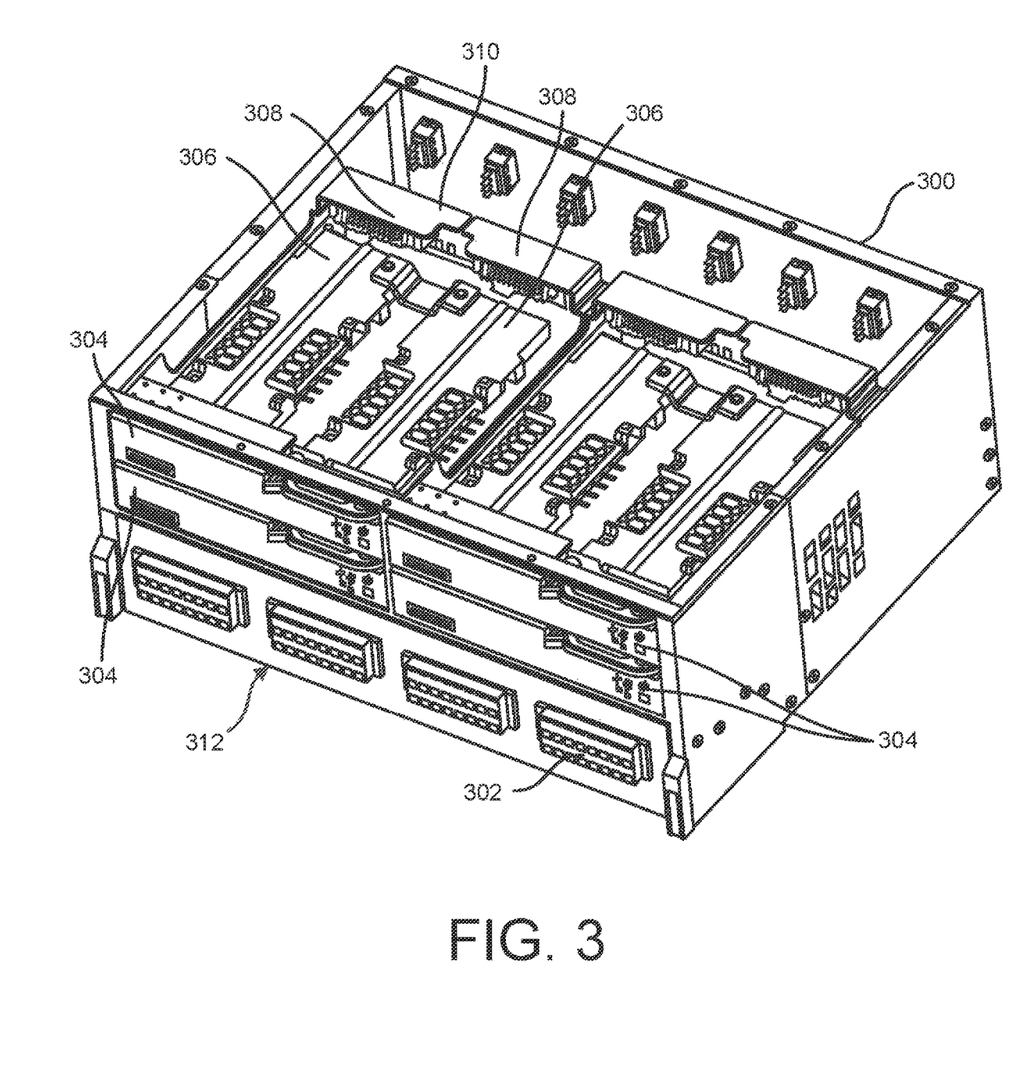
FIG. 3 illustrates perspective view of an example switch enclosure.

FIG. 3 illustrates perspective view of an example switch enclosure 300 that includes four removable switch units 304 (similar to the hot swappable ASIC switch modules 104 shown in FIGS. 1 & 2), where each switch unit 304 has two switch ASICs 306 packaged into one field replaceable switch unit 304. In this example configuration, the network cable connectors 302 are positioned on a front side 312 of the switch enclosure 300 and four replaceable switch units 304 are removably positioned in the switch enclosure 300 at a position above (respectively) the network connectors 302. The replaceable switch units 304 are hot-swappable, meaning that they are independently removable from the switch enclosure 300, and each replaceable switch unit 304 includes two ASIC chips 306 positioned on each replaceable switch unit 304. The back side 310 of each of the replaceable switch units 304 includes a replaceable switch unit fixed connector 308. The replaceable switch unit fixed connector 308 may be rigidly mounted to the replaceable switch unit 304 and may be in communication with an input/output of the onboard ASIC chips 306. In similar fashion to the example embodiments described in FIGS. 1 and 2, the replaceable switch unit fixed connector 308 is positioned and configured to releasably engage a corresponding switch enclosure fixed connector (not shown in FIG. 3) to transmit signals therethrough. In this example embodiment, any one or more of the replaceable switch units 304 may be removed from the switch enclosure 300 without disconnecting any of the data transmission cables or wires connected to the network cable connectors 302. Similarly, any of the ASIC chips 306 may be removed or replaced on the replaceable switch unit 304 without disconnecting any of the data transmission cables or wires connected to the network cable connectors 302.

Figure 4:
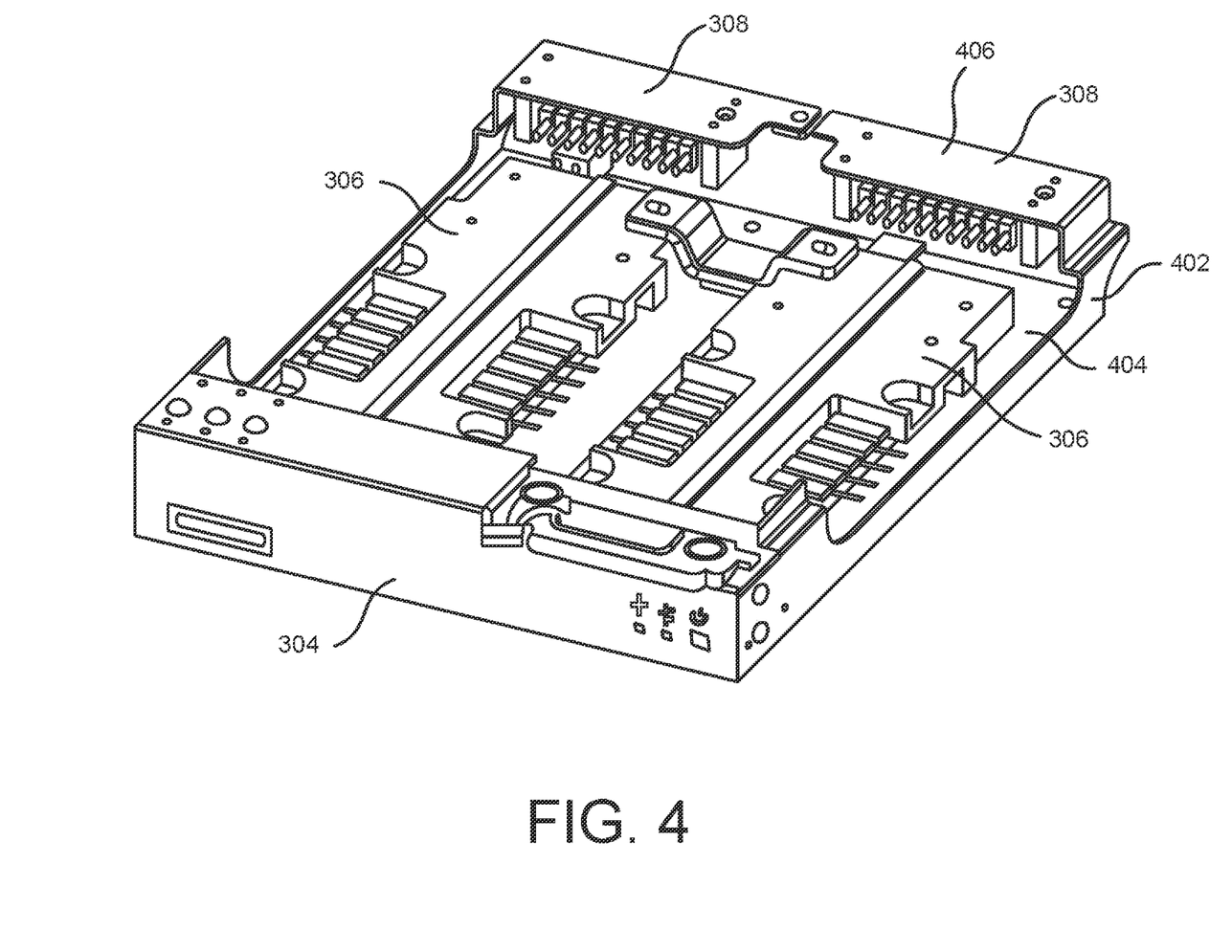
FIG. 4 illustrates a perspective view of an example switch unit.

FIG. 4 illustrates a perspective view of an example replaceable switch unit 304. The perspective view of the replaceable switch unit 304 removed from the switch enclosure 300 shows the supporting frame 402 of the replaceable switch unit 304. The supporting frame 402 may have an electronics board 404 secured thereto, wherein the electronics board 404 (typically a silicon chip set or mount that may include a plurality of conductive and insulative layers configured to support one or more electronic components thereon) is configured to support and provide power and communication to/from the two ASIC chips 306 mounted thereto. The ASIC chips 306 may communicate with the replaceable switch unit fixed connector 308 that is mounted to a backside connector mounting member 406, which is a portion of the supporting frame 402. The supporting frame 402 may include guide members (not shown) configured to assist with inserting or removing the replaceable switch unit 304 to/from the switch enclosure 300 in a proper alignment. The replaceable switch unit fixed connector 308 secured to the backside connector mounting member 406 at a position configured to releasably connect with a corresponding fixed connector (not shown) mounted to the switch enclosure 300 so that electrical or optical signals may be transmitted between the two connectors with minimal loss.

Figure 5:
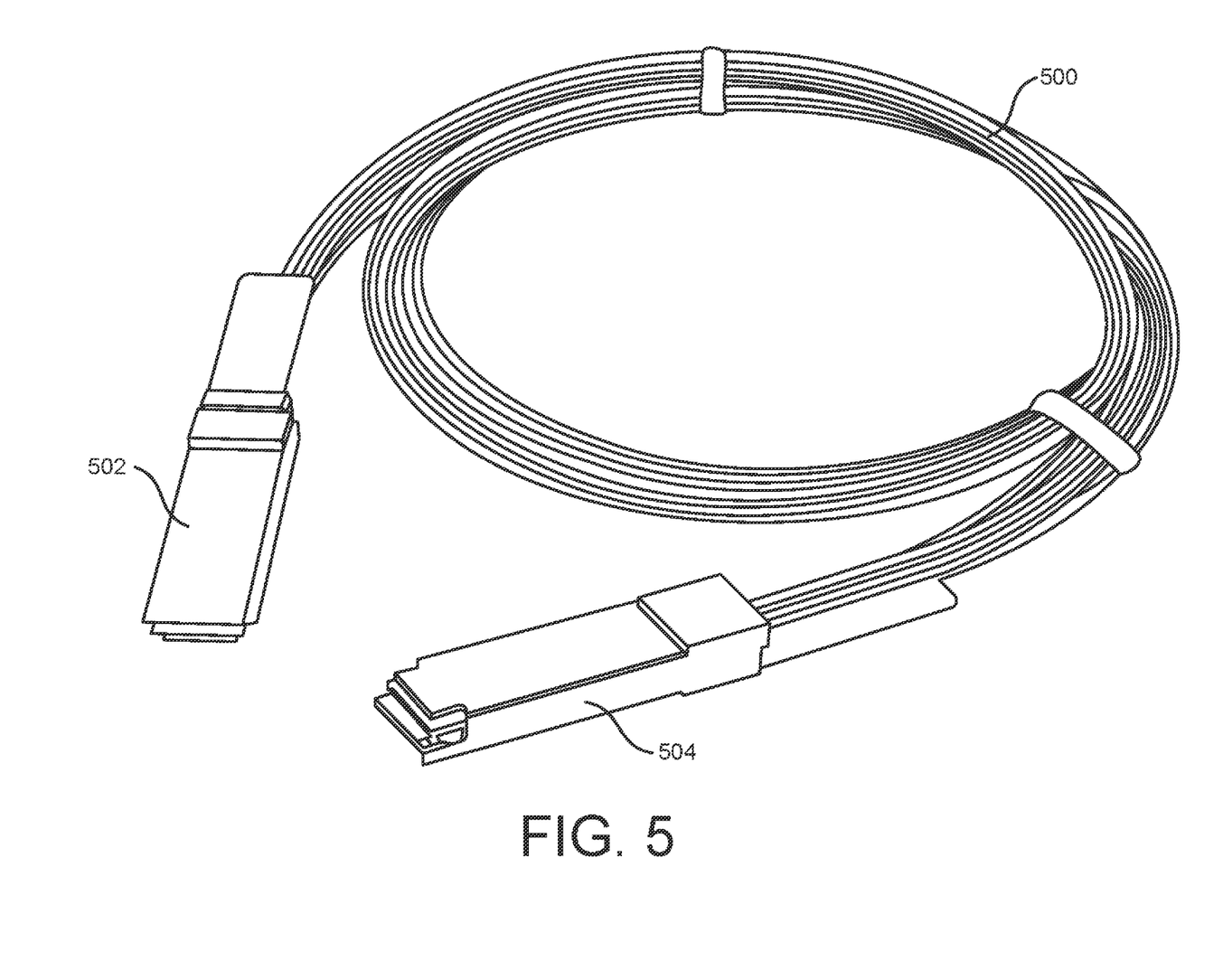
FIG. 5 illustrates an example active optical connection cable used with a switch enclosure.
Figure 6:
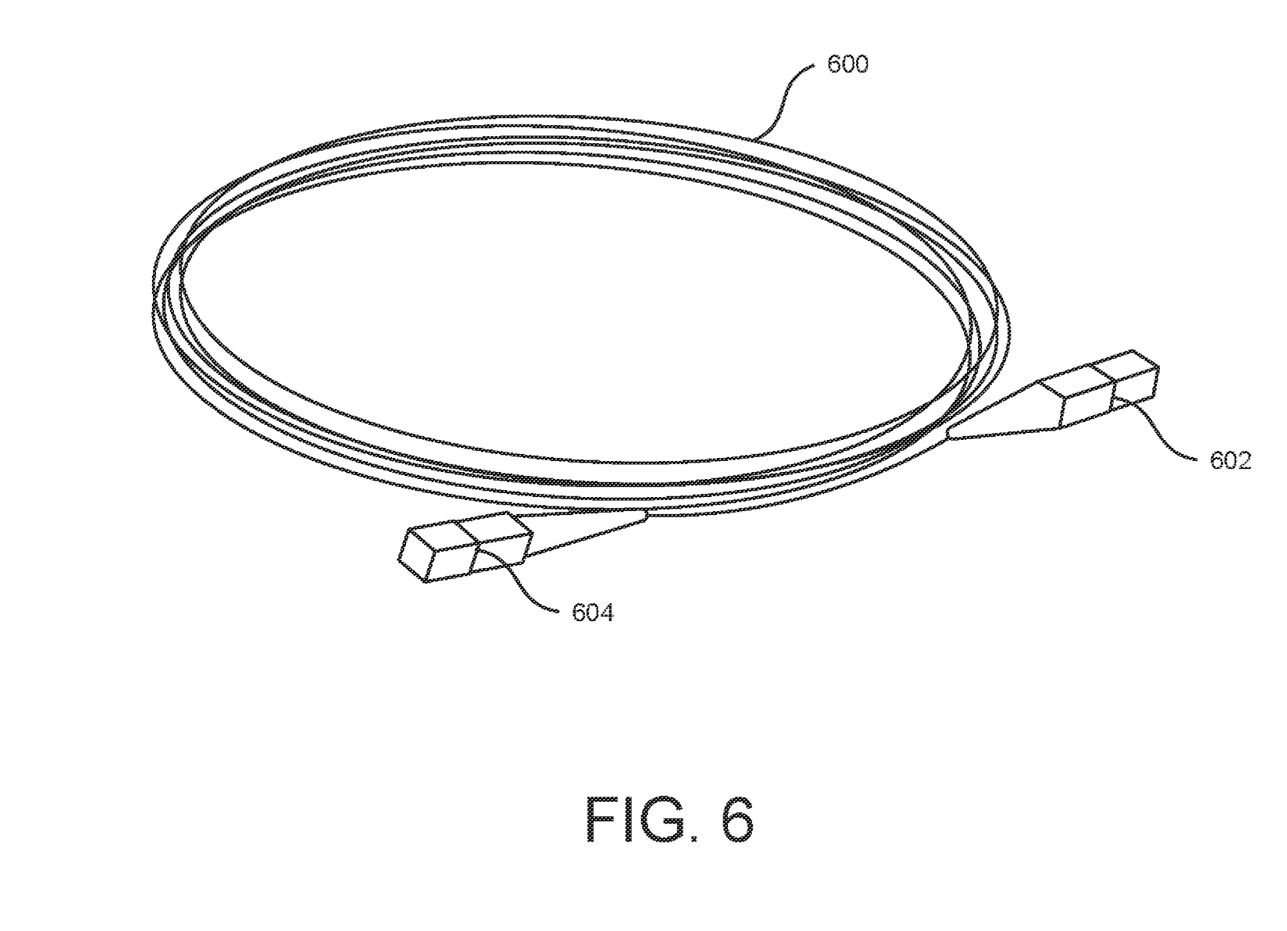
FIG. 6 illustrates an example passive optical connection cable used with a switch enclosure.

FIG. 5 illustrates an example active optical connection cable used with an example switch enclosure. The active optical connection cable 500 includes terminating ends 502, 504 that have an optical transceiver built into the connector ends 502, 504. As such, the active optical connection cable 500 may be used to receive an electrical signal at one of the connector ends 502 and convert the electrical signal into an optical signal that may be transmitted through the optical connection cable 500 and output from the other of the connector ends 504. The active optical connection cable 500 may be implemented at any location in the example embodiments described herein to convert an electrical signal into an optical signal for further transmission through the switch topology. Similarly, FIG. 6 illustrates a passive optical signal transmission cable 600 that includes passive terminating ends of the cable 602, 604. The passive optical signal transmission cable receives optical signals and transmits the signals therethrough via one or more optical fibers. The terminating ends 602, 604 of the passive optical signal transmission cable 600 may include devices configured to communicate the optical signals from a terminating end 602, 604 of the cable 600 to another device or cable. Example devices that may be used at the optical connection points to facilitate the transmission of an optical signal through a connector with minimal loss include lenses, optical ferrules, and fiber optic couplers that may be spring-loaded so that the optical fiber faces are pressed together appropriately for signal transmission therethrough with minimal losses when the optical connectors are mated together.

Figure 7:
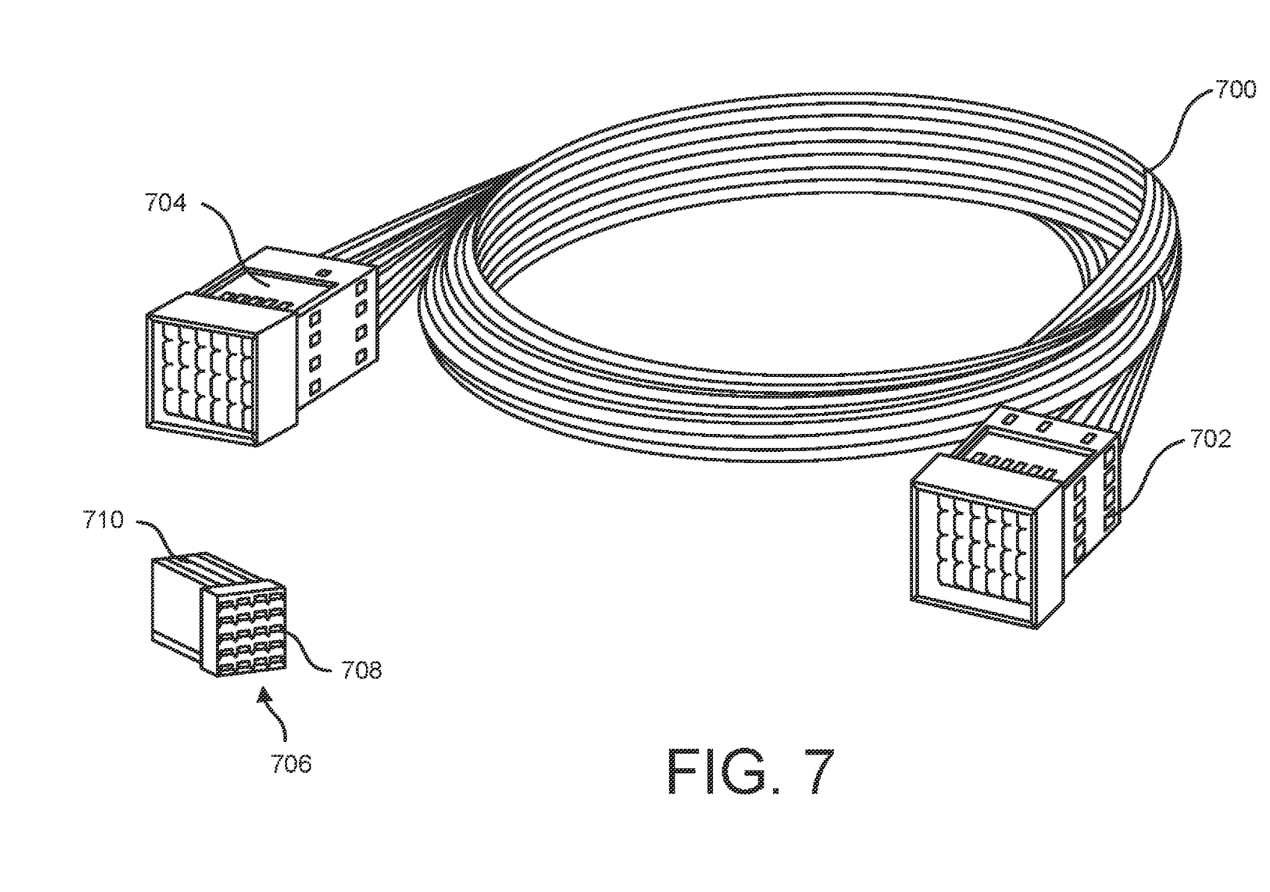
FIG. 7 illustrates an example electrical connection cable used with a switch enclosure.

Similarly, FIG. 7 illustrates an example backplane electrical connection cable 700 used to connect an electrical output hot-swappable ASIC module to and adjacent switch enclosure fixed electrical connector. The example backplane connector 700 includes terminating ends 702, 704 that include a plurality of electrical connection points, which may be 16 connection points in the exemplary figure. The backplane connector terminating ends 702, 704 may generally include a male portion of the electrical connection, as the accompanying backplane connector terminating end receiver 706 may include corresponding female electrical connection points 708. As such, the terminating ends 702, 704 may be positioned to engage the terminating end receiver 706 to provide electrical connection therebetween. Further, the backplane terminating end receiver 706 may be rigidly mounted via an outer connector body 710 so that the terminating ends 702 or 704 may be guided into a position for connection with the backplane connector terminating end receiver 706.

Figure 8:
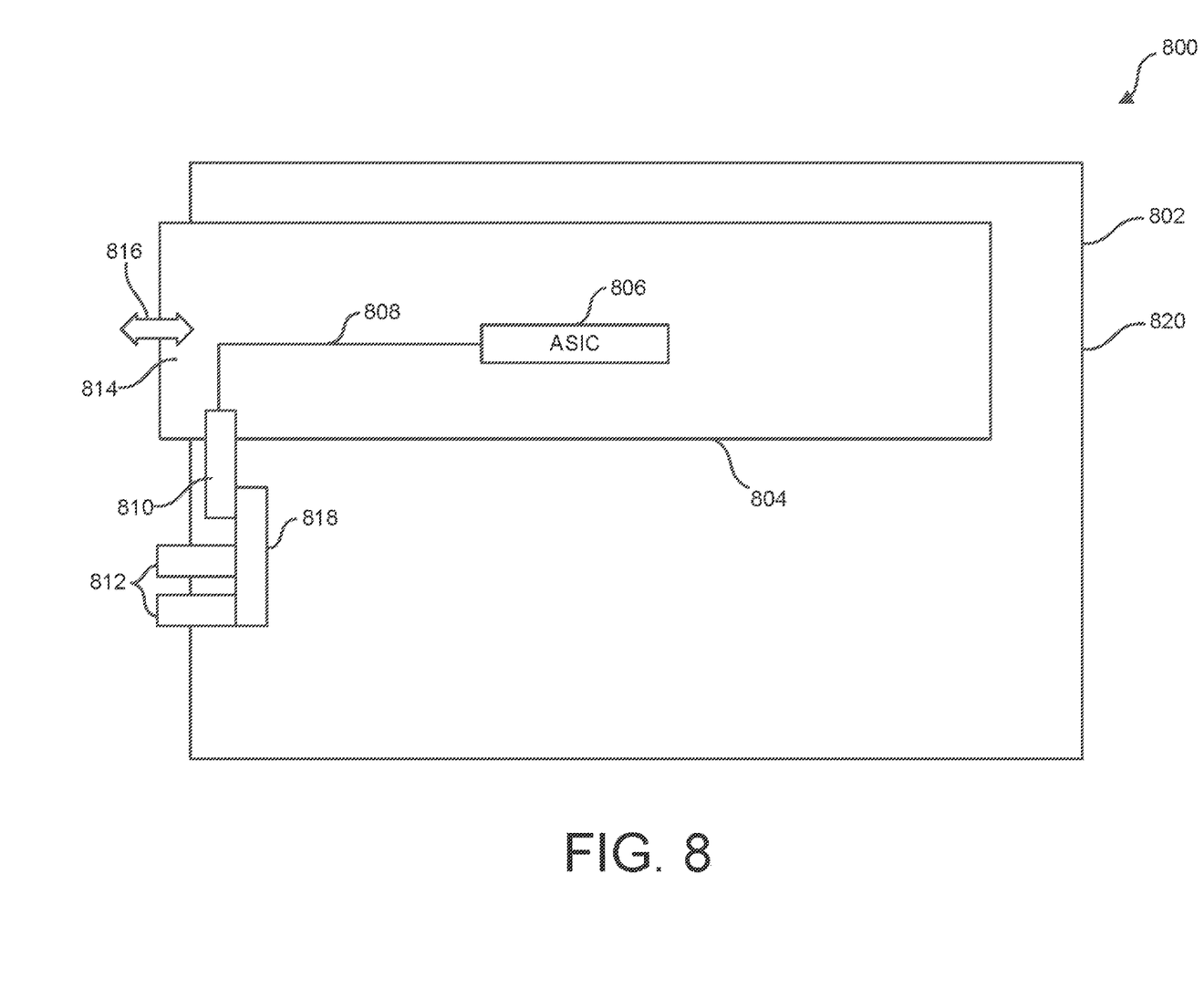
FIG. 8 illustrates a side schematic view of an example switch enclosure.

FIG. 8 illustrates a side schematic view of an example switch 800. The switch 800 includes a switch enclosure 802 having a hot-swappable ASIC module 804 removably positioned therein. The hot-swappable ASIC module 804 includes an ASIC chip 806 that is in direct electrical communication (without a link or wire) with an ASIC module connector 810 via a communication link 808. The ASIC module connector 810 is positioned near a front side 814 of the hot-swappable ASIC module 804. The ASIC module connector 810 may be configured to removably or detachably engage a switch enclosure fixed connector 818 that is in direct communication with network cable connectors 812 positioned on a front side 814 of the switch enclosure 802. Therefore, in similar fashion to the example embodiments described above, the hot-swappable ASIC module 804 may be inserted into the switch enclosure 802 in the direction of arrows 816 from the front side 814 toward the back side 820 of the switch enclosure 802. As the hot-swappable ASIC module 804 is inserted into the switch enclosure 802, the respective connectors 810, 818 engage each other to provide a signal path from the ASIC chip 806 through to the network cable connectors 812. The connectors 810, 818 may be electrical or optical, as described above. However, the example embodiment described in FIG. 8 eliminates one or more connection points and/or communication links or wires between the ASIC chip 806 and the network cable connectors 812 by moving the connection points to the front side 814 of the switch, while still disaggregating the front side 814 or faceplate network cable connectors 812 from the internal components of the network switch 800.

Example embodiments of the disclosure have application to various different types of signal transmission topologies involving switches, such as a SAN, WAN, LAN, and other types of network topologies or configurations that involve a switch and signal transmission between elements, devices, or components of the topology.

In the preceding, reference is made to examples or example embodiments of the disclosure, however, the scope of the disclosure is not limited to specific described examples or embodiments. Rather, any combination of the above noted features, elements, or functionalities, whether related to different examples or not, is contemplated to implement and practice embodiments of the disclosure. Furthermore, although embodiments disclosed herein may achieve advantages over other possible solutions or over the prior art, whether or not a particular advantage is achieved by a given embodiment is not limiting of the scope of the disclosure. Thus, the preceding aspects, features, embodiments and advantages are merely illustrative and are not considered elements or limitations of the appended claims except where explicitly recited in a claim. Further, as used herein, directional or orientation terms such as front, rear, side, top, bottom, up, down, back, forward, etc. are not meant to be limiting, but merely reflect the orientation of the example elements or embodiments as they appear in the Figures. It will be understood that the nomenclature used to designate each element is interchangeable depending on the spatial orientation, and as such, these terms are not intended to be limiting of the scope of the claims.

While the foregoing is directed to embodiments presented in this disclosure, other and further embodiments may be devised without departing from the basic scope of contemplated embodiments, and the scope thereof is determined by the claims that follow.

We claim:

1. A swappable network switch, comprising:
   a switch enclosure having an opening and a plurality of network cable connectors;
   a switch module removably received in the opening of the switch enclosure, the switch module comprising a module connector, wherein the module further comprises an ASIC chip, comprising optically enabled inputs and outputs configured to interface with the module connector, mounted to an electronic board, input/outputs of the ASIC chip being in signal transmission communication with the module connector;
   a switch enclosure connector positioned in the switch enclosure and configured to directly connect to the module connector when the switch module is received in the opening of the switch enclosure; and
   a signal communication link provided between the switch enclosure connector and the plurality of network cable connectors, the signal communication link configured to create a signal communication path between the plurality of network cable connectors and the switch module.

2. The swappable network switch of claim 1, wherein the module connector and the switch enclosure connector comprise optical connectors.

3. The swappable network switch of claim 2, wherein the optical connectors comprise spring-loaded fiber optic couplers having optical fiber faces that are pressed together to provide an optical signal transmission path therethrough when the optical connectors are mated together.

4. The swappable network switch of claim 1, wherein the module connector optically engages and is configured to communicate signals therethrough to the switch enclosure connector.

5. A swappable network switch, comprising:
   a switch enclosure having an opening;
   a switch module removably positioned in the opening;
   a plurality of network cable connectors positioned on the switch enclosure;
   a module connector positioned on switch module, wherein the module connector is mounted on a first end of the switch module that is opposite a second end of the switch module that is first inserted into the opening, the first end being positioned near a front side of the switch enclosure when the switch module is received in the opening; and
   a switch enclosure connector positioned in the switch enclosure and configured to directly engage with the module connector when switch module is received in the opening of the switch enclosure and to communicate signals to the plurality of network cable connectors.

6. The swappable network switch of claim 5, further comprising a signal communication link provided between the switch enclosure connector and the plurality of network cable connectors, the signal communication link configured to create a signal communication path between the plurality of network cable connectors to the switch module.

7. The swappable network switch of claim 5, wherein the switch enclosure connector directly connects to the plurality of network cable connectors, wherein the swappable switch module is removable from the switch enclosure without disconnecting any of the plurality of network cable connectors.

8. The swappable network switch of claim 7, wherein directly connected further comprises a spring loaded optical connector in communication with the module connector and the switch enclosure connector without links or optical fiber cabling.

9. The swappable network switch of claim 5, wherein the module further comprises an ASIC chip mounted to an electronic board, input/outputs of the ASIC chip being in signal transmission communication with the module connector.

10. The swappable network switch of claim 7, wherein the ASIC chip is an optical ASIC chip outputting optical signals to the module connector.

11. The swappable network switch of claim 5, wherein the module connector and the switch enclosure connector comprise optical connectors.

12. The swappable network switch of claim 5, wherein the module connector electrically or optically engages and is configured to communicate signals therethrough to the switch enclosure connector.

13. The swappable network switch of claim 5, wherein the switch module comprises an electronic ASIC chip generating electric signal outputs.

14. The swappable network switch of claim 5, wherein the module connector and the switch enclosure connector are configured to communicate electronic signals.

15. A swappable network switch, comprising:
 a switch enclosure having a module receiving opening;
 a switch unit removably received through the module receiving opening, wherein the switch module comprises an electronic ASIC chip generating electric signal outputs and the switch enclosure connector is configured to communicate the electric signal outputs;
 a module connector provided on the switch module;
 a switch enclosure connector positioned in the switch enclosure at a location configured to directly engage with the module connector when the switch module is received through the module receiving opening; and
 a signal communication link between the switch enclosure connector and a plurality of network cable connectors positioned on a front side of the switch enclosure.

16. The swappable network switch of claim 15, wherein the switch unit is removable without removing or disconnecting any data cables in communication with the plurality of network cable connectors.

17. The swappable network switch of claim 15, wherein the electronic ASIC chip outputs electrical signals that are communicated to an optical transceiver that converts the electrical signals to optical signals, the optical transceiver being in optical communication with the switch enclosure connector.

* * * * *